Dec. 15, 1964 YOSHIZO KITANO 3,160,898
HIGH-SPEED, AUTOMATIC SCREW CUTTING MACHINE
Filed Oct. 25, 1960 4 Sheets-Sheet 3

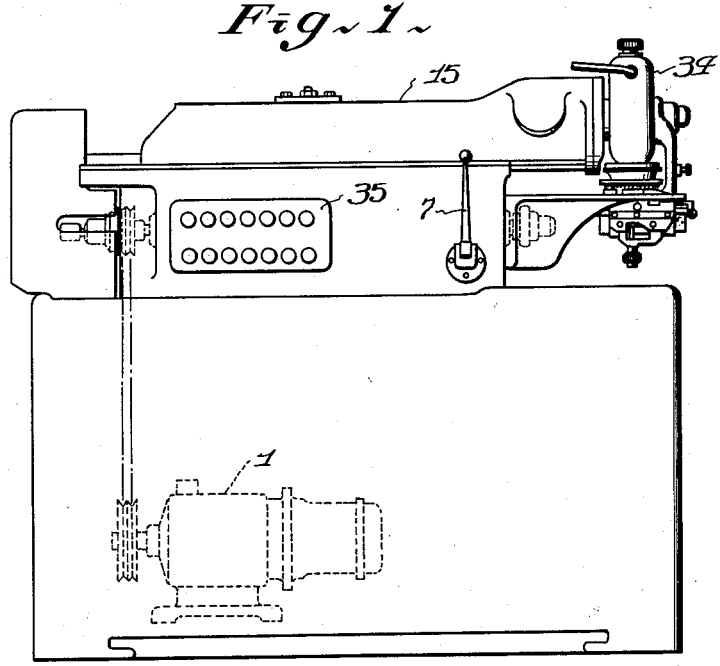
Fig~1~
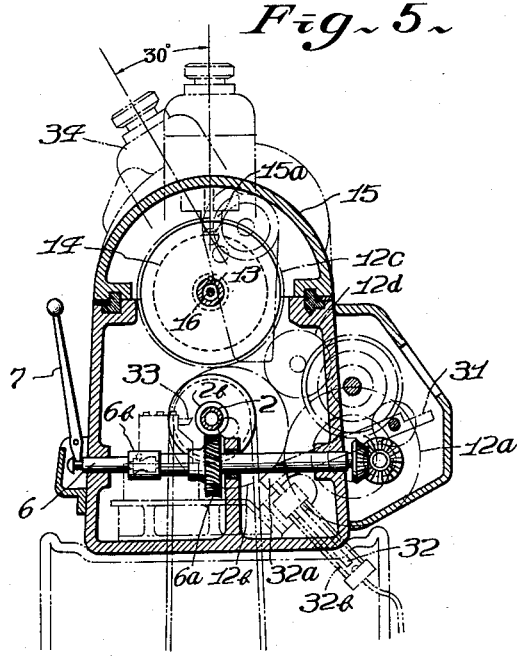
Fig~5~
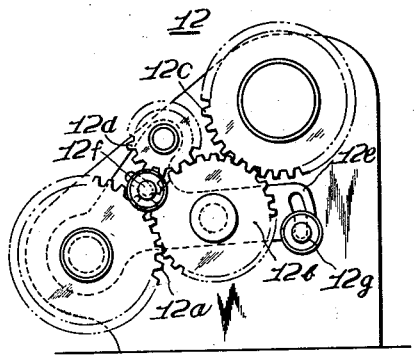
Fig~6~
YOSHIZO KITANO
INVENTOR
BY
Mason, Porter, Diller & Stewart
ATTORNEYS

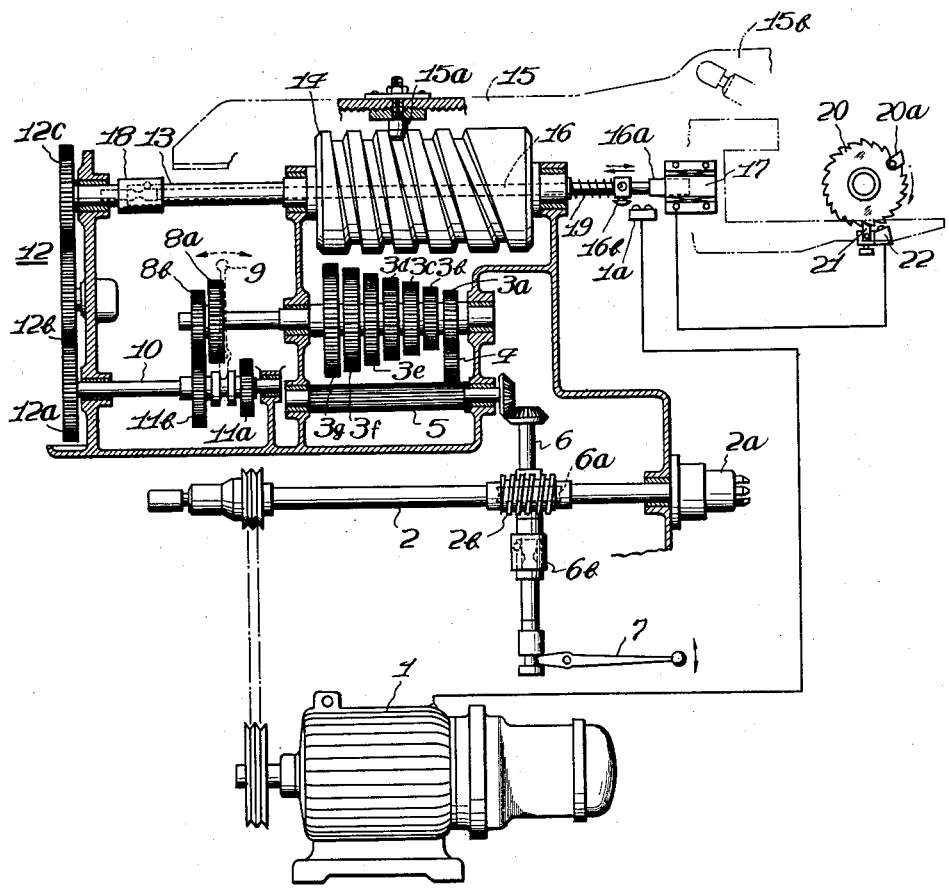

YOSHIZO KITANO
INVENTOR
BY
Mason, Porter, Diller & Stewart
ATTORNEYS

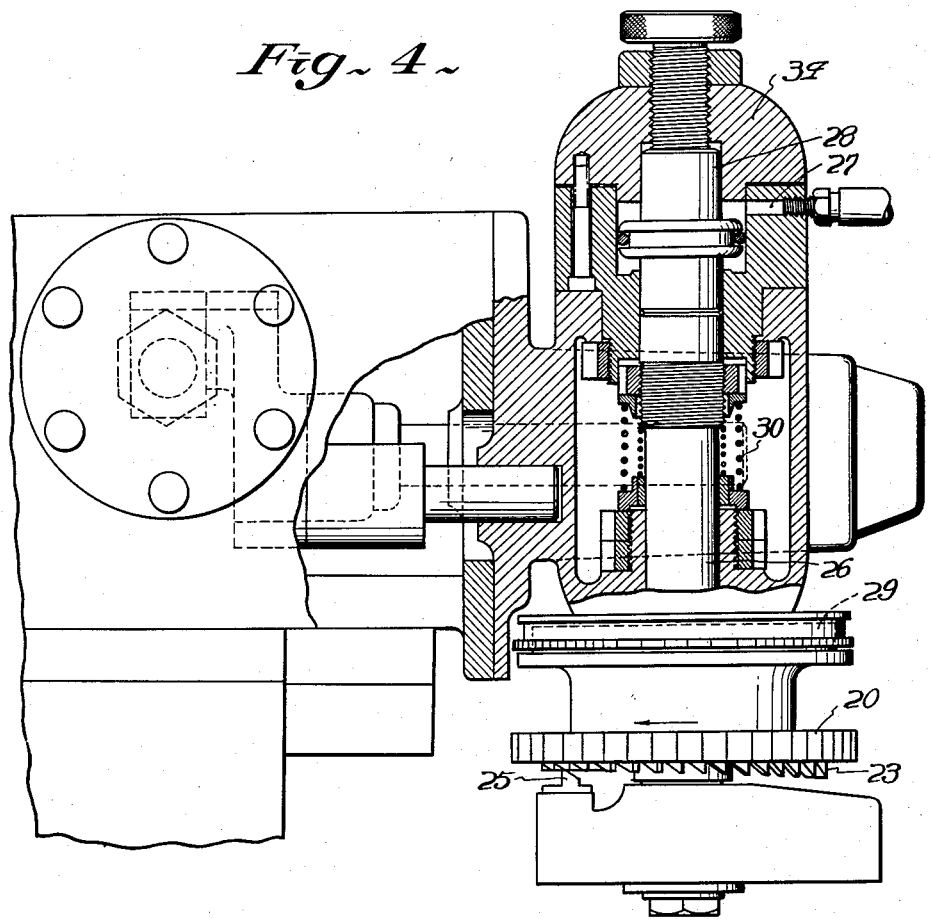

3,160,898
HIGH-SPEED, AUTOMATIC SCREW CUTTING MACHINE
Yoshizo Kitano, 1-22 Fukiagehonmachi, Chikusa-ku, Nagoya-shi, Japan
Filed Oct. 25, 1960, Ser. No. 64,819
Claims priority, application Japan Oct. 31, 1959
5 Claims. (Cl. 10—101)

This invention relates to powered screw-cutting machines, and more particularly it relates to a new and improved, high speed, automatic screw-cutting machine.

It is an object of this invention to provide a new and improved, high speed, screw-cutting machine which has a fully automatic operation.

It is another object of this invention to provide such a screw-cutting machine having a relatively simple mechanical construction yet having a high degree of precision and reliability.

Said objects and other objects of this invention have been attained by the screw-cutting machine of this invention, comprising a main rotating shaft to one end of which the work piece is fixed and which is rotated by a prime mover; a lead cam mechanism which rotates corelatively with said main shaft; a ram which is made to undergo reciprocating motion regulated by the said lead cam mechanism and which supports on one end thereof a tool head; and other mechanisms such as a device for feeding, mounting, and ejecting the work piece, the above various mechanisms being operated interlockingly in suitable manner by means of electrical solenoids, relays, and limit switches. By means of such a machine, particularly such a machine provided with a lead cam mechanism (Japanese Utility Model No. 445406) invented by the present inventor, high-speed screw cutting of a large variety of screws can be accomplished fully automatically at a high production rate, yet with high precision.

The novel features which are considered as characteristic for the invention are set forth in particular in the appended claims. The invention itself, however, both as to its construction and its method of operation, together with additional objects and advantages thereof, will be best understood from the following description of specific embodiment when read in connection with the accompanying drawings, in which the same and equivalent members are designated by the same numerals and references, and in which:

FIG. 1 is a side elevational view showing the exterior view of one embodiment of this invention;

FIG. 2 is a schematic side view, showing the power transmission system of the embodiment of FIG. 1;

FIG. 4 is a front elevational view, partly in section and with parts cut away, showing the internal construction of the tool head portion of the embodiment of FIG. 1;

FIG. 5 is a side elevational view, partly in section, showing the machine portion containing the clutch lever for stopping the operation of the lead cam of the above embodiment;

FIG. 6 is a side elevational view of the principal parts of the normal-reverse rotation switching device of the lead cam of the above embodiment.

Figure 3:
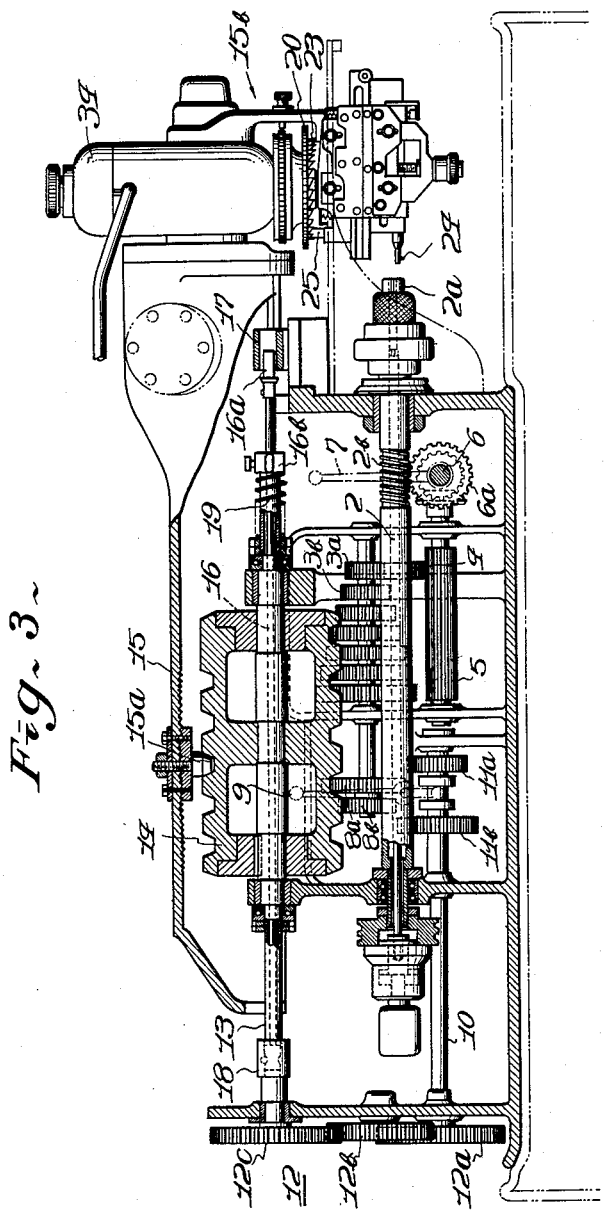
FIG. 3 is a front elevational view, partly in section and with parts cut away, showing the internal construction of principal parts of the embodiment of FIG. 1.

Referring to the drawings, reference numeral 1 designates an electric motor which is the main motor and which drives a main shaft 2, which has a collet chuck 2a installed on its one end for holding the work piece and a worm gear 2b installed at an intermediate position thereof. The driving power can be transmitted from said main shaft 2 to a shaft 6 through said worm gear 2b and a gear 6a which is mounted on the shaft 6 and is in mesh with the worm gear 2b, by the engagement of a clutch 6b installed on said shaft 6, said engagement being effected by the manipulation of a lever 7.

The driving power is transmitted from the shaft 6 to a screw pitch shaft 5, thence through an idler gear 4 to a set of screw-pitch-adjusting gears 3a, 3b, 3c, 3d, 3e, 3f, and 3g, which are provided for the purpose of changing, in combined action with a lead cam 14, the screw pitch of the screw being cut.

The driving power is further transmitted from said gear set 3a, 3b, etc., through either of gears 8a, and 8b, which are installed on the same shaft as said gear set, and which are of different diameters, and through a mating pair of slide-shifting gears 11a and 11b, which are of correspondingly different diameters, and either of which can be made to engage effectively with its corresponding gear of the pair of gears 8a and 8b by the manipulation of a lever 9, to a shaft 10 on which said gears 11a and 11b are installed.

The driving power is thence transmitted from the shaft 10, through an interchangeable gear train 12, consisting of gears 12a, 12b, 12c, and 12d to a lead cam shaft 13, said gears 12a and 12c being supported by the machine frame, and said gears 12b and 12d being supported by a two arm lever 12e which is pivotally supported on the shaft of the gear 12a. The said gear train 12 is adapted to enable reversal of the rotational direction of said lead cam shaft 13, as may be seen in FIG. 6, by changing the number of the gears participating in the power transmission. That is, as will be clearly understood from FIG. 6, when a lever 12e is fixed to the position as shown in FIG. 6 by tightening the pin shafts 12f and 12g, the gear 12d becomes an idler gear, and the gears 12a, 12b and 12c are successively meshed, whereby power transmission in one direction is attained. On other hand, when the lever 12e is, after releasing the pin shafts 12f and 12g, turned clockwise so as to make the gear 12d mesh with the gear 12c and to make the gear 12b disengage from the gear 12c, and then said pin shafts 12f and 12g are tightened, the gears 12a, 12b, 12d, and 12c are successively meshed, whereby the direction of power transmission is reversed.

A lead cam 14, which has on its cylindrical, peripheral surface a plurality of cam grooves, each groove having a different slope or lead, is fixed coaxially on the aforesaid shaft 13. A guide pin 15a affixed rigidly to a ram 15 which carries the tool head assembly 15b is fitted as a cam follower in one of said cam grooves. A rod 16, having at one end an iron core 16a for actuation by an electromagnetic solenoid 17 and at the other end a ball clutch 18 for engaging the lead cam shaft 13 to or disengaging it from the preceding drivnig mechanism, is disposed coaxially with and through the center of the aforesaid shaft 13 and lead cam 14. The solenoid 17 actuates the ball clutch 18 and also a push piece 16b which is fixed to the rod 16 and which actuates a main motor switch 1a. A spring 19 imparts a force on the rod 16 toward the left, as viewed in FIGS. 2 and 3.

In the tool head assembly 15b supported by the ram 15, a ratchet wheel 20, which is supported freely by a shaft on the ram 15 and is in engagement with a fixed pawl 21, is made to rotate clockwise through an angle corresponding to one tooth thereof for each cycle of reciprocating motion of the ram 15. Said ratchet wheel 20 causes a push piece 20a to rotate with it and operate a switch 22 for the circuit of the solenoid 17. A ratchet wheel 23, which is for regulating the vertical advance of a cutting tool 24 for each cycle of reciprocating motion of the ram 15, is affixed below and coaxially with the ratchet wheel 20. The teeth of the said ratchet wheel 23 are faced downward and the locus passing through their apexes is sloped so that the height (or length) of the said teeth increases continuously. A pawl 25, which is attached to a shaft 26 passing through the aforesaid ratchet wheels 20 and 23, is engaged with the ratchet wheel 23.

The tool head 34 is provided with an inlet 27 for oil under pressure and contains a piston 28 which transmits a vertical motion to the top of the shaft 26. The tool head is further provided with a ratchet return spring 29 for returning the aforesaid ratchet wheels 20 and 23 to their starting positions upon completion of their motions and a return spring 30 for raising pawl 25 upward when said oil under pressure is removed.

The work piece is fed from a hopper (not shown) by a guide rail 31 to the front of a collet chuck 2a and is further pushed by the head 32a of a feed lever 32 to a position where said collet chuck can clamp and hold said work piece. Said lever 32 is supported by a supporter 32b so that it can be moved interlockingly with various limit switches and relays (not shown).

The operation of the machine as illustrated in FIGS. 1–6 will be best understood by reference to the following description covering both automatic operation and manual operation.

For automatic operation, a push button switch for changing from manual operation to automatic operation or vice versa is switched to its automatic positions, and the switch of an oil motor for feeding oil under pressure is operated, whereby the solenoid, relay, and limit switch of the work piece supply system function, and the automatic work piece feed lever 32 is driven and feeds the work piece, sent from the guide rail 31, to the collet chuck 2a, which then clamps and holds said work piece.

On one hand, oil under pressure is imparted at the tool head through the inlet 27 into the piston cylinder of the piston 28, whereby the shaft 26 lowers the pawl 25 which has been engaged with the ratchet wheel 23. Consequently, said ratchet wheel 23 is made to return to its starting position by the return spring 29, which has been forced to store energy by the preceding screw cutting operation. Then, when the oil under pressure is removed, the piston 28 and the shaft 26 are pushed up by the return spring 30. Therefore, the pawl 25 engages again with the ratchet wheel 23 at a position where the height (or length) of the teeth is small (FIG. 4).

When the work piece has been clamped in the chuck, and the automatic work piece feed lever 32 has returned to its original position, the main motor 1 starts, and the main shaft 2 begins to rotate. Simultaneously, a lathe-work cutting tool 33, which is installed independently of the ram 15, operates and carries out a cutting operation of the surface of the work piece. In this instance, since the rod 16 passing through the lead cam shaft 13 is pulled to the right, as viewed in the drawings, and the ball clutch 18 is disengaged, the lead cam 14 is stopped.

Upon completion of the machining operation of the surface cutting of the work piece, the tool head 34 starts to move from its immobile position and causes the switch (not shown) of the solenoid 17 to be switched off. Consequently, the rod 16 is pulled to the left, by the spring 19, the ball clutch 18 is engaged, and the lead cam 14 begins to rotate. Therefore, the ram 15, receiving driving power through its guide pin 15a, commences its reciprocating motion according to the groove with which said pin is engaged, thus advancing and retracting the screw-cutting tool 24 of the tool head 34 to carry out the screw-cutting operation. For this operation, said guide pin 15a is inserted beforehand into the required groove of the lead cam 14. For example, if said guide pin is inserted into a groove with a large slope, that is, a large lead, the stroke of the ram 15 (hence, the stroke of the cutting tool 24) will be large and be suitable for cutting a long screw.

As mentioned before, the ratchet wheel 20 rotates clockwise by one tooth for each cycle of reciprocating motion of the ram 15, and the ratchet wheel 23, which rotates as a unit with said ratchet wheel 20, causes the pawl 25 to be pushed downward one tooth at a time by the gradually increasing height of the tooth of said ratchet wheel 23, thereby causing the cutting tool 24 to cut into the work piece.

When the screw cutting operation has progressed to the required extent, the push piece 20a fixed to the ratchet wheel 20 presses on and closes the switch 22, whereby the solenoid 17 is excited and caused to pull the rod 16 to the right, as viewed in the drawings. Consequently, the ball clutch 18 is disengaged, and the motion of the lead cam 14 is stopped. Simultaneously, the push piece 16b on the rod 16 switches off the switch 1a of the main motor 1, and the rotation of the main shaft 2 stops. On one hand, the tool head 34, which has carried out screw cutting, tilts from its operational position, thereby causing the collet chuck 2a to open and the product to be ejected out. Simultaneously, the work piece feeding system operates, prior to the succeeding screw-cutting operation, and causes the work piece to be clamped in the chuck 2a, and the switch of the main motor is switched on.

In parallel with the above-described actions, the oil under pressure is supplied to the tool head 34, and the ratchet wheels 20 and 23 are returned to the starting positions.

The above-described processes are repeated automatically and successively by the functioning of solenoids and relays installed within a control box (not shown) and the limit switches installed at suitable positions of the mechanical devices.

In the case of manual operation, the motions of the various mechanical elements during automatic operation as described above are controlled by the series of push button switches on the control panel 35. The selection and setting of the screw pitch can be effected at will by the selection of the groove of the lead cam 14 into which the pin 15a is inserted; selection of the gear of the gear set (3a, 3b . . . ) with which the idler gear 4 is engaged; or selection of the combination of either gears 8a and 11a or gears 8b and 11b. In practical application, the various parts mentioned above are preferably numbered, and a table indicating the relation between combinations of such numbers and the dimensions of the finished product is prepared so that the operator may, on the basis of said table, preset the parts for the finished product required.

Thus, with the machine of this invention, by previously inserting the guide pin which controls the reciprocating motion of the ram in the proper groove of the lead cam to conform to the length of the screw to be machined, and, on the basis of the aforesaid table of screw pitch, presetting the positions of the pitch-adjusting members by means of such devices as levers, fully automatic screw-cutting operation can be repeatedly carried out with a single push button. As a result, it is possible to fabricate a large quantity of screws at an extremely high speed, yet with accuracy.

While I have described one particular embodiment of my invention, it will, of course, be understood that I do not wish my invention to be limited thereto, since many modifications may be made and I, therefore, contemplate by the appended claims to cover all such modifications as fall within the true spirit and scope of my invention.

What I claim is:

1. A high speed, automatic screw-cutting machine comprising a frame, a main shaft carried by said frame and having a work holder at one end thereof, means for rotating the main shaft, a screw-pitch-adjusting gear mechanism rotatable with said main shaft, a lead cam mechanism operatively connected to said main shaft by said screw-pitch-adjusting gear mechanism, a ram member connected to said lead cam mechanism and reciprocable along an axis parallel to the longitudinal axis of said main shaft, and a tool head assembly mounted on said ram, said tool head assembly including means for holding a thread cutting tool in proper relationship to a work piece carried by said work holder, ratchet means carried by said ram member, said ratchet means controlling the number of threads cut by said tool, means on said tool holding means cooperating with said ratchet means to incrementally advance said tool towards a work piece to vary the depth of a cut, said ratchet means including a toothed ratchet wheel normally held in an initial position and adapted to rotate a one-tooth distance upon each reciprocation of said ram, a normally open switch operatively spaced from said ratchet wheel adjacent a first tooth and a switch closing member attached to said ratchet wheel adjacent a second tooth which is spaced apart from said first tooth a predetermined number of teeth equal to the number of threads to be cut in the work piece whereby upon rotation of the ratchet wheel, said predetermined number of teeth, the member closes the switch which in turn causes the rotational cessation of the work piece.

2. A high speed, automatic screw-cutting machine comprising a frame, a main shaft carried by said frame and having a work holder at one end thereof, means for rotating the main shaft, a screw-pitch-adjusting gear mechanism rotatable with said main shaft, a lead cam mechanism operatively connected to said main shaft by said screw-pitch-adjusting gear mechanism, a ram member connected to said lead cam mechanism and reciprocable along an axis parallel to the longitudinal axis of said main shaft, and a tool head assembly mounted on said ram, said tool head assembly including means for holding a thread cutting tool in proper relationship to a work piece carried by said work holder, ratchet means carried by said ram member, said ratchet means controlling the number of threads cut by said tool, and means on said tool holding means cooperating with said ratchet means to incrementally advance said tool towards a work piece to vary the depth of a cut, a spring member operationally associated with said ratchet wheel, said spring member adapted for compression during the thread cutting operation and for expansion so as to return the ratchet wheel to its initial position upon the completion of the thread cutting operation.

3. The apparatus of claim 2 including means for preventing the spring return of said ratchet wheel upon the completion of said thread cutting operation.

4. The apparatus of claim 3 wherein said last mentioned means is a ratchet wheel tooth engaging pawl and including a shaft, said pawl operatively associated with the shaft, means for urging said shaft to a normal position whereat said pawl engages said ratchet wheel and means for moving said shaft to a position where said pawl is disengaged from said ratchet wheel.

5. An automatic screw-cutting machine comprising a frame, a main shaft having a work holder at one end thereof for holding a work piece, drive means for rotating said main shaft and work holder, a screw-pitch-adjusting gear mechanism rotatably driven with said main shaft, a lead cam mechanism, clutch means operatively connecting said lead cam mechanism to said screw-pitch-adjusting gear mechanism, a ram member connected to said lead cam mechanism and reciprocable along an axis parallel to the longitudinal axis of said main shaft, a tool head assembly mounted on said ram member and including means for holding a cutting tool in proper relation to a work piece carried by said work holder, said tool head assembly including means for actuating said clutch means to disconnect said lead cam mechanism from said screw-pitch-adjusting gear mechanism upon completion of a cutting operation, said lead cam mechanism including a cylinder, a plurality of separate cam grooves formed in said cylinder, each of said grooves having a different lead, and a cam follower affixed to said ram and selectively insertable into one of said cam grooves for varying the stroke of said ram.

References Cited in the file of this patent
UNITED STATES PATENTS

| | | |
|---|---|---|
| 380,785 | Bogert | Apr. 10, 1888 |
| 424,527 | Worsley | Apr. 1, 1890 |
| 782,220 | Coulter et al. | Feb. 14, 1905 |
| 1,179,362 | Sparks | Apr. 11, 1916 |
| 2,251,588 | Gilbert | Aug. 5, 1941 |
| 2,489,203 | Siekmann et al. | Nov. 22, 1949 |
| 2,511,196 | Cuttat | June 13, 1950 |
| 2,772,578 | Kling | Dec. 4, 1956 |
| 2,808,598 | Mannaioni | Oct. 8, 1957 |
| 2,811,876 | Batchelder | Nov. 5, 1957 |
| 2,828,845 | Thornton | Apr. 1, 1958 |
| 3,026,549 | Hartshorn | Mar. 27, 1962 |
| 3,066,330 | Howe et al. | Dec. 4, 1962 |
| 3,073,194 | Ciccarelli | Jan. 15, 1963 |

FOREIGN PATENTS

| | | |
|---|---|---|
| 514,890 | France | Nov. 19, 1920 |